United States Patent
Radu et al.

(10) Patent No.: US 8,992,760 B2
(45) Date of Patent: Mar. 31, 2015

(54) MEMBRANE ELECTRO-CATALYTIC SYSTEM AND PROCESS FOR OBTAINING FUEL GAS

(75) Inventors: Marin Radu, Bucharest (RO); Florica Radu, Bucharest (RO); Valentin Radu, Bucharest (RO); Daniela Radu, Bucharest (RO); Florian Cioroianu, Craiova (RO); Mariana Cioroianu, Craiova (RO)

(73) Assignee: S. C. Centrul de Cercetare Pentru Materiale Macromoleculare Si Membrane S.A. (S. C. Comm S. A.), Bucharest (RO)

( * ) Notice: Subject to any disclaimer, the term of this patent is extended or adjusted under 35 U.S.C. 154(b) by 0 days.

(21) Appl. No.: 13/811,585

(22) PCT Filed: Apr. 20, 2011

(86) PCT No.: PCT/RO2011/000015
§ 371 (c)(1),
(2), (4) Date: Jan. 22, 2013

(87) PCT Pub. No.: WO2012/011829
PCT Pub. Date: Jan. 26, 2012

(65) Prior Publication Data
US 2013/0118908 A1    May 16, 2013

(30) Foreign Application Priority Data
Jul. 23, 2010   (RO) .................................... 10-0642

(51) Int. Cl.
  *C25B 13/04*  (2006.01)
  *C25B 9/16*   (2006.01)
  (Continued)

(52) U.S. Cl.
  CPC ............... *C25B 13/04* (2013.01); *C01B 3/501* (2013.01); *C01B 3/58* (2013.01); *C25B 9/00* (2013.01);
  (Continued)

(58) Field of Classification Search
  CPC ........................................................ C25B 1/02
  USPC ........................................ 205/530, 615–639
  See application file for complete search history.

(56) References Cited

U.S. PATENT DOCUMENTS

6,257,175 B1   7/2001   Mosher et al.
6,303,009 B1  10/2001   Bossard
(Continued)

FOREIGN PATENT DOCUMENTS

EP   0 405 919 A1   1/1991
EP   1 601 613     12/2005
(Continued)

OTHER PUBLICATIONS

International Search Report mailed Aug. 29, 2011 in PCT Application No. PCT/RO2011/000015.

*Primary Examiner* — James Lin
*Assistant Examiner* — Ho-Sung Chung
(74) *Attorney, Agent, or Firm* — Hershkovitz & Associates, PLLC; Abraham Hershkovitz (57) ABSTRACT

An electro-catalytic membrane system for preparing fuel gas from water operates at normal levels of pressure and temperature. The system includes a high frequency power source, a power supply system, a programmable control unit, an electro-catalytic membrane module, and a module for processing the fuel gas. The electro-catalytic membrane module includes metallic electrodes in a concentric arrangement. The space between the concentric electrodes includes granular carbon and metallic particles. A fixed membrane is arranged at a lower end of the space while a mobile membrane is arranged at an upper end of the space. The electro-catalytic membrane module is further provided with sensors for measuring process parameters, conduits, and valves for supplying and removing liquids. A system for cooling the metallic electrodes is also provided.

8 Claims, 8 Drawing Sheets

Longitudinal section through the membranary electro-catalytic system for generation of ecological fuel gas from water (51) Int. Cl.
*C01B 3/58* (2006.01)
*C01B 3/50* (2006.01)
*C25B 9/00* (2006.01)
*C25B 15/00* (2006.01)

(52) U.S. Cl.
CPC . *C25B 9/16* (2013.01); *C25B 9/166* (2013.01); *C25B 15/00* (2013.01); *C01B 2203/0405* (2013.01); *C01B 2203/0435* (2013.01); *C01B 2203/0475* (2013.01); *Y02E 60/366* (2013.01)
USPC ........................................................ 205/637

(56) References Cited

U.S. PATENT DOCUMENTS

| | | |
|---|---|---|
| 2005/0098443 A1 | 5/2005 | Gomez |
| 2005/0217991 A1 | 10/2005 | Dahlquist, Jr. |
| 2008/0102342 A1 | 5/2008 | Cho et al. |
| 2008/0257751 A1 | 10/2008 | Smola et al. |

FOREIGN PATENT DOCUMENTS

| | | |
|---|---|---|
| GB | 2 418 424 A | 3/2006 |
| WO | WO 2004/071946 | 8/2004 |

Fig. 1 General scheme for ecological fuel gas obtention from water

A – Electrical supply circuit

B – Power circuit

C – Generator of primary fuel gas

D – Membranary module for ecological fuel gas obtention

S – Voltage source

Parts list for the power circuit B:

K1 – Contactor coil

K2 – Contactor coil

C11, C12 - Contactor contacts C1

C21, C22 - Contacor contacts C2

Fig. 2 Longitudinal section through the membranary electro-catalytic system for generation of ecological fuel gas from water Fig. 3 Cross section of the membranary electro-catalytic system for
generation of ecological fuel gas from water Fig. 4 Power supply scheme

PARTS LIST OF EASY820-DC-RC PROGRAMMER

F1 - automatic switch 10 A
F2 - fuse 1A
I - signalling switch
M1, m1 - level sensors
T1, T2 - temperature transducers
PS - gas pressure transducer
K1, K2 - contactor coil DILM750
P1 - electropump
E1, E2 - electrovalves

INPUTS/OUTPUTS LIST

Inputs:
I1 – off/on switch
I2, I3 - level sensors M1, m1
I7, I8 - temperature transducers
I11 - gas pressure transducer Outputs:
Q1, Q2 - drive timing k1, k2
Q3, Q4 - contactor drive k3, k4
Q5 - pump drive P1
Q6 - electrovalve drive E1
QA1 – electrovalve drive E2

Fig. 5 CONTROL SCHEME USING THE EASY820-DC-RC PROGRAMMER

- 17 Cover
- 18 Flame
- 19 Burner body
- 20 Stainless steel sieve
- 21 Magnesium membrane
- 22 Membrane Fig. 6 Membranary module for carbon retention Fig. 7 Embodiment with concentric electrodes Fig. 8 Embodiment with spiral-shaped electrodes

MEMBRANE ELECTRO-CATALYTIC SYSTEM AND PROCESS FOR OBTAINING FUEL GAS

CROSS-REFERENCE TO RELATED APPLICATIONS

The present application is a national stage application filed under 35 U.S.C. §371 from PCT International Application No. PCT/RO2011/000015, filed Apr. 20, 2011, and published as International Publication No. WO 2012/011829 A1 under the Patent Cooperation Treaty (PCT) on Jan. 26, 2012, based upon a claim of priority from Romanian Application No. 2010/00642 filed on Jul. 23, 2010.

BACKGROUND OF THE INVENTION

1. Field of the Invention

The invention refers to a membrane electrolytic procedure for in situ generation of a fuel gas from water, under normal temperature and pressure conditions, without requiring transportation or storage, as well as the characteristics of this gas which make it useful and devoid of risks in exploitation, for both domestic and industrial applications.

2. Discussion of Background Information

The world economic crises, corroborated with the current climatic changes, have a common denominator, namely the lack of valid technological solutions for regenerative energy.

In the past century, the major world powers have had fierce battles with the states rich in oil resources, thus managing to lead to intense poverty and human victims. These past "imperialist" battles prove today to be useless, making it possible for many financial and human efforts to be oriented towards finding alternative solutions for regenerative energy.

Unfortunately, this situation is still valid in the present. Out of inertia, many of today's governments in the well developed countries still are and still act under the influence of the events and practices of the past century, aiming at overexploiting the existing fossil fuel resources and investing very little in research so as to find new viable solutions for the energy resources needed for the future generations.

Being used in highly specific purposes in the chemical, electrical and spatial industries, for over three decades, hydrogen has attracted the interest of the public authorities and of the research institutions, as well as that of the businesspeople, as being a clean fuel for transportation or as source for generating electric energy. Vast multidisciplinary research and development activities have been initiated and developed with priority all around the globe, aiming at elaborating efficient technologies for the production, separation, purification, storage, transportation and utilization of hydrogen under conditions of security and safety.

In the following, we will present several patented inventions that currently exist around the world and by which hydrogen is produced:

European Patent 1601613_A2 (International Publication No. WO 2004/071946) is entitled System for the production of hydrogen gas. This system, according to its patent, uses a catalyst (e.g., nickel, cobalt) for the chemical reaction between Sodium borohydride ($NaBH_4$) and water, cu generating hydrogen and Sodium metaborate: $NaBH_4+2H_2O \rightarrow 4H_2+NaBO_2$. The hydrogen thus produced is separated by help of a membrane (e.g., of fluoropolymers). There are many patented inventions based on this principle, with variations on reactive materials, structural materials and constructive solutions.

Great Britain Patent 2418424 (published on the 29 Mar. 2006) is entitled Hydrogen Production using the Castner Reaction. The hydrogen destined to be used as fuel is produced by the Castner reaction whereby the sodium hydroxide reacts with carbon to produce hydrogen and sodium as main products and sodium carbonate as a secondary product. Liquid sodium reacts with a counter current of steam, producing hydrogen again, as well as sodium hydroxide as a secondary product. Sodium peroxide then further reacts with water and regenerates sodium hydroxide. The thus generated hydrogen can be burnt by combination with oxygen, producing high pressure steam, usable for the production of electric energy. As carbon, several items can be used, such as coal, coke or even biological material. For a 500 MW power plant 200 tons of coal per hour are necessary, the global theoretical efficiency being 32%. The Castner reaction is produced at approximately 1000° C. Primary hydrogen is used for the production of electric energy and secondary hydrogen is used for the heating of the reaction environment.

U.S. Pat. No. 6,303,009 B1 is entitled Hydrogen generator with the control of the reversed reaction. The production of hydrogen can be made through water electrolysis induced in the course of a protons shifting membrane. Hydrogen is produced on one side of the membrane and oxygen on the other. The gas production is calibrated through the electric current which traverses the membrane, provided by a highly efficient, programmable continuous current source. The membrane is not subjected to any pressure difference and does not require support by a metallic net, being highly more durable compared to other solutions of this kind produced before. Several electrolysis cells can be connected in series. The produced hydrogen is very pure, only being contaminated by water vapors. The electrolysis takes place at a low temperature (preferable under 10° C.), heat shifters being used for taking over the heat produced in the course of the process (thus diminishing the water vapor contamination).

U.S. Pat. No. 6,257,175 B1 is entitled Device for generating oxygen and hydrogen for internal combustion engines. Hydrogen and oxygen are generated to be used for the internal combustion engine of a vehicle, using the electrical system of the vehicle to provide power to the electrolysis process. This process is only active when the engine is working and stops when the engine is switched off. The hydrogen and the oxygen are collected separately and are sent through separate pipes to the engine's distribution system. The used water is stored in a reservoir in which the water level is maintained constant. Distilled water is used, to which sodium hydroxide or a similar electrolyte is added. For electrodes, titanium is preferred, but stainless steel or other metals can be equally used.

European Patent 0405919 A1 (published on the 2 Jan. 1991) is entitled Water-propelled Internal Combustion Engine. Hydrogen gas, used as fuel for the internal combustion engine, is obtained through water electrolysis at the intake of the vehicle, and is then injected into the engine's combustion chambers. To produce electrolysis, the electric current generated by the engine is used. Hydrogen is first mixed with saturated dry steam, which leads to a combustion produced at lower temperatures and in an easier to control manner. The invention can be applied in stationary installations for the production of electric energy. To produce electrolysis, "ionized water"

is used, that is water which contains ions (for example, water obtained from dissolving salts—i.e., distilled water in which NaCl is dissolved at a concentration of 30 g/l), in order to increase its electrical conductibility.

Another procedure well known is the electrochemical gasification of coal is a complex, costly procedure, which generated byproducts such as: ash, tar and sulfuric compounds.

In all cases known up to the present, the production of hydrogen from water is followed by a series of costly operations, such as the liquefaction and storage which lead to the inefficiency of its use in domestic and industrial applications. At the same time, the H—O mixture, resulting from water electrolysis, is a gas with reduced applicability because of its risk of exploding, which it is known to do.

SUMMARY OF THE INVENTION

The membrane electro-catalytic system which is the object of the current invention eliminates the disadvantages of the previously presented inventions, because it includes:

A continuous source of pulsed current (A) with the frequency of 20 kHz;

A force system (B) made up of a switched reluctance generator (S) and contactors ($C_1$) and ($C_2$);

An automatic command module for a programming installation;

A membrane electrolytic module (C) made up of:
internal metallic electrodes (1), accessorized with two lids (9) connected to a system which allows the continuous cooling, electro-isolated on the inside and connected to a copper conductor that connects it to the source, as well as some peripheral metallic electrodes (2), plated on the inside or having an electro-chemical deposit in a composite layer, with a series of metals, such as Ni, Cr, Fe, Mg, Cu, pinned with two plates of high density polypropylene (4), which plates (4) have four "O" rings (8), are electro-isolated on the outside, and connected to a copper conductor to connect it to the source, said electrodes (1 and 2) each having a 2-3 mm thick wall;

a catalyst (13) based on carbon nano-particles or atoms, acting as an electrolyte, catalyst, agent of homogeneity and gas stabilizer; the active surface area can reach 2000 $m^2/g$ and can be obtained from carbonized vegetable materials, activated with water vapors, the catalyst (13) being combined with Ni, Cr, Fe, Mg, Cu, acting as promoters.

a receptacle (3), made of high density polypropylene, with two lids (12), and minimum level sensors (m) and maximum level sensors (M), as well as with a temperature sensor ($T_1$), the upper lid (12) having a junction for the evacuation of the primary gas through the electro-valve ($E_1$) and with a water feeding junction from the pump ($P_1$), through an electro-valve ($E_1'$), and the lower lid (12) having a junction for water exhaust when the water temperature surpasses 45° C., at the signal given by a temperature sensor ($T_1$), through the electro-valve ($E_2$), the direction vent ($S_1$) extending towards the consumer (c), the lids (12) each having an "O" ring (10) as a sealing system for the electrodes (1);

two composite membranes (5), (11) to ensure the permeability of the formed gas, of the water and of a number of oxides produced in the space in-between the electrodes, which membranes delimit and fix the catalyst (13) and the promoters between the two concentric electrodes (1 and 2), out of which one membrane is fixed at its lower end and the other is mobile, acted upon by spring (15) to ensure the pressure of the catalyst (13) on the electrodes (1 and 2);

a water cooling system for the electrodes (1 and 2), fitted with two electro-isolated surfaces, one on the inside of the electrode (1) and the other on the outside of the electrode (2), in order to avoid the creation of ions in the outer cooling circuit of the assembled electrodes, also acting as a controller of the quantity of $CO_2$ created, made up of a heater (6), pipes (7) fitted with a manometer (M), a water tap ($R_1$), an air shaft ($R_2$), an electro-pump ($P_2$), a filter (F), a supra pressure vent ($S_2$) and a water collector-distributor (16);

A membrane module (D) to obtain ecological fuel gas, which module (D) contains a composite membrane (22), 3 to 5 mm thick, at the lower end of the receptacle body (19), ensuring the permeability of the gas in the body, as well as a stainless steel, truncated, conical sieve (20), with Mg charge (21), which will ensure the reduction of the $CO_2$, thus resulting in pure carbon and magnesium oxide.

The membrane electrolytic system, according to the invention, comprises several generating modules, linked in series or in parallel to the same power source and to the same regulatory system.

The energetic ratio: consumed electric energy/produced caloric energy residing in hydrogen and exothermic chemical reaction energy between the catalyst and oxygen, is of $\frac{1}{2}$-$\frac{1}{5}$.

In a preferential variant, the catalyst (13), introduced in the space in-between the electrodes (1) and (2), is a granulated graphite.

The composite membrane (5) is 7-10 mm thick and is obtained by pouring between the catalyst and the promoters a solution of: polysulphide 10-12%, polyethylene glycol (PEG) 0.1-0.2%, the difference being N-methyl-2-pyrrolidinone (NMP).

In a preferred embodiment, the pipe-shaped electrodes (1) and (2) are made of copper.

In another preferred embodiment, electrodes (1) and (2), pipe-shaped, are of stainless steel or copper and are spiral-shaped.

In yet another preferred embodiment, in the space in-between the electrodes (1) and (2), a copper or stainless steel electrode is introduced to be connected to the negative terminal (cathode).

The membrane module (D) can be replaced with a liquid membrane.

The membrane electrolytic system for the obtainment of a fuel gas from water, using the invention, resides in the fact that, when water is traversed by an electric current having the frequency of 20 kHz, tension varies between 40 and 80 V, either for 40 sec. of direct tension and 20 sec. of reversed tension, or for 40 min. of direct tension and 20 min. of reversed tension, resulting in a fuel gas containing 98-99% $H_2$, 0.99-1.8% $O_2$ and 0.01-0.2% $CO_2$ and the pressure is maintained between 0.1 and 0.2 bar, while the water pressure is then maintained between 0.5 and 2 bar, and the water temperature is between 25 and 45° C.

In a different embodiment, continuous power sources are used, pulsed with frequencies—between 50 Hz and 20 kHz.

The electro-catalytic membrane system, according to the invention, has the following advantages:
it allows the production of the ecological fuel gas at maximum efficiency, under normal conditions of temperature and pressure, without requiring transportation and storage;

the nano-particles and carbon atoms-based catalyst acts as an electrolyte, which brings homogeneity and stability to the gas. Carbon also has a high level of reactivity due to the high frequency electrical impulses which lead to the trigger of its electrons, thus favoring the formation of carbon dioxide through the reaction with the oxygen from the water;

the chosen catalyst favors the creation of a high electrical conductivity and of a technical mass transfer, also having a stabilizer role for the fuel gas, through its mixing with the $CO_2$;

it uses regular and cost-efficient materials;

the production of the ecological fuel gas in situ, without transportation and storage at the temperature and pressure of the environment;

it has a high efficiency due to the use of the catalyst as agglomerated nano-particles and atoms and also due to the use of microelements (Ni, Cr, Fe, Mg, Cu) which act as promoters.

The electro-catalytic membrane system for the obtainment of a fuel gas from water, according to the invention, allows its production at maximum efficiency, at normal levels of temperature and pressure, without transportation and storage, being characterized by the fact that it is made of:

a) a high frequency continuous power source (A) (20 kHz);
b) a force system (B);
c) a membrane electro-catalytic module (C), made up of:
c1) pairs of copper pipes (the pipes having different diameters), electrodes having the following dimensions: one of the pipes with the external diameter (d), the other with the internal diameter D where $D=(1.8-2) \times d$, and the thickness of the pipes is 2-3 mm. The larger diameter electrodes are plated on the inside or fitted with an electrochemical coating in a composite layer with a series of metals, such as: Ni, Cr, Fe, Mg, Cu, acting as an oxide reducer, being 0.5-1 mm thick. In the space in-between the two electrodes, active coal from the carbon nano-particles is introduced, their active surface area reaching 2000 $m^2/g$, obtained from vegetable material, activated with water vapors and microelements (Ni, Cr, Fe, Mg, Cu). The role of the carbon nano-particles is that of an electrolyte, catalyst and agent of homogeneity, favoring electric conductivity as well as thermic and mass transfer. The active carbon is at the same time a source of $CO_2$, acting as a stabilizer in the gas mix obtained electrolytically. As a result of the interaction of the electric field with water molecules, with large surface coal, as well as with a series of microelements (Ni, Cr, Fe, Mg, Cu), dispersed through the granular carbon, in volume of 0.1-0.5%, there is an increase in the polarity of the bond H—O leading to the deformation and breaking of these bonds. The electro-catalytic process is accelerated through the use of 3d transitional metals (Fe, Ni, Cr, Cu) and Mg acting as a promoter. The two electrodes are connected to the continuous power source in parallel. In order to generate hydrogen in situ, the chemical, thermic and electric affinities of the $O_2$ and its combinations have been watched and exploited, hydrogen practically emerging as a secondary (collateral) element.

c2) two composite membranes which delimit and fix the catalyst and the promoters between the two concentric electrodes, a membrane which is fixed at the lower end and another mobile membrane at the upper side, triggered by a string so as to ensure the pressure of the catalyst on the electrodes. The composite membrane is 7-10 mm thick and is obtained by pouring over the catalyst and promoters a solution of: polysulphone 10-12%, polyethylene glycol (PEG) 0.1-0.2%, the difference being N-methyl-2-pyrrolidinone (NMP). The composite membrane ensures permeability to the formed gas, water and oxides produced in the space in-between the electrodes. The outer electrode is equipped with an orifice which is fed with granule carbon and promoter microelements. Promoters can also be used in an ionic state.

c3) a water cooling system for the electrodes, fitted with two electro-isolated surfaces, one on the inside of the electrode (1) and the other on the outside of the electrode (2), in order to avoid the creation of ions in the outer cooling circuit of the assembled electrodes. This cooling system can control the quantity of $CO_2$ created and can provide to the system between 30-35% of the energy generated in the electro-catalytic system, as a result of the exothermal reactions produced between the electrodes.

The cooling system is made up of a radiator, pipes fitted with a manometer (M), a water tap ($R_1$), an air shaft ($R_2$), an electro-pump ($P_2$), a filter (F), a supra-pressure vent ($S_2$) and a water collector-distributor (16). Another element of the electro-catalytic system is a membrane module (D) for the obtainment of ecologic gas. The module D also contains a membrane identical with the one described above, being placed at the base of a housing ensuring the permeability of the gas in the housing. In the housing, there is a truncated, conical sieve with Mg charge which ensures the reduction of the $CO_2$, thus generating pure carbon, magnesium oxide and thermal energy as a result of the exothermal reaction. Passing hydrogen over the magnesium oxide regenerates magnesium and water, in a process taking place in the presence of heat.

In a different embodiment, the electrodes can be made of:
1) three concentric copper or stainless steel pipes, the inner diameter of the third pipe being $D_1=D+d$, in which the inner electrode is connected to the cathode (−) (this also being an attrition electrode), and the other two electrodes being connected to the anode, having the same catalyst content and promoter elements in the space in-between the electrode, or
2) two spiral-shaped copper or stainless steel electrodes with the same axis, 1-1.5 mm thick, fitted with a space for the catalyst and the promoter elements.

Another catalyst option is using granular graphite instead of active carbon. The fuel gas obtained contains: 98-99% $H_2$, 0.99-1.8% $O_2$, 0.01-0.2% $CO_2$.

BRIEF DESCRIPTION OF THE DRAWINGS

The invention is broadly presented in the following drawings which represent.

DETAILED DESCRIPTION OF THE PRESENT INVENTION

Figure 1:
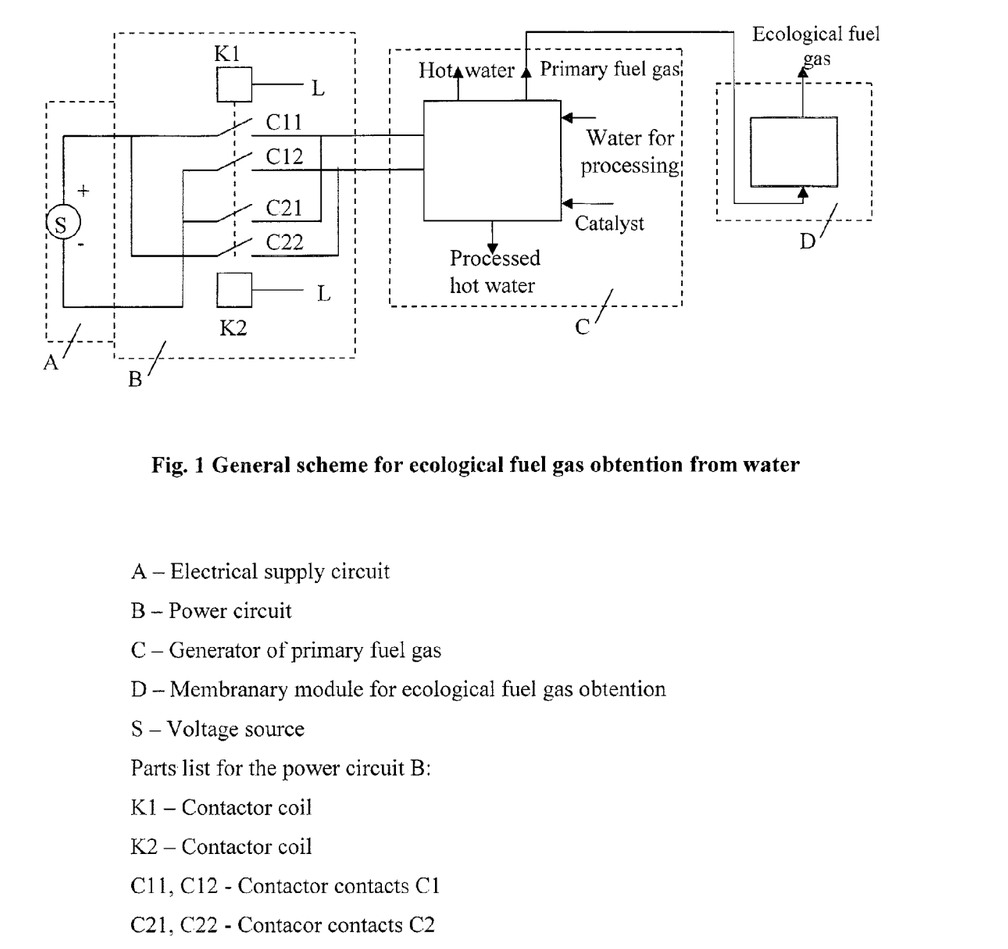
FIG. 1, the obtainment of ecological fuel gas from water.

According to the invention, the system solves the problem of producing in situ fuel gas from water using a catalyst, either granule coal in the form of nano-particles, or very small diameter graphite grains, without transportation and storage, at normal temperature and pressure, without explosion dangers. The invention has the following components:

- a continuous power source A, FIG. 1;
- a force system B, FIG. 1, which regulates the electrodes' potential and the intermittent shift of their polarity and which also regulates the water flow in the generation circuit, in the temperature-based sensors $T_1$ and $T_2$ of the cooling system, and in the pressure sensors made up of a continuous power source S and contactors $C_1$ and $C_2$. The automatic command of the installation is made by the programmer EASY820-DC-RC;
- an electro-catalytic membrane module C, FIG. 2, made of:
  - a copper electrode 1, with the external diameter d, 9 pieces, fitted with two lids 9, which link to a continuous cooling system, electro-isolated on the inside and soldered to a copper conductor which links the copper electrode 1 to the source;
  - a copper electrode 2, with the internal diameter D where D=(1.8–2)×d, 9 pieces, plated on the inside or with a composite layer, electrochemical coating with a series of metals, such as Ni, Cr, Fe, Mg, Cu, with a role in the oxidation-reduction, fixed with two high density polypropylene plates 4. Plates 4, have four "O" rings 8 for each electrode, electro-isolated on the exterior and soldered to a copper conductor which links the copper electrode 2 to the source.

Figure 2:
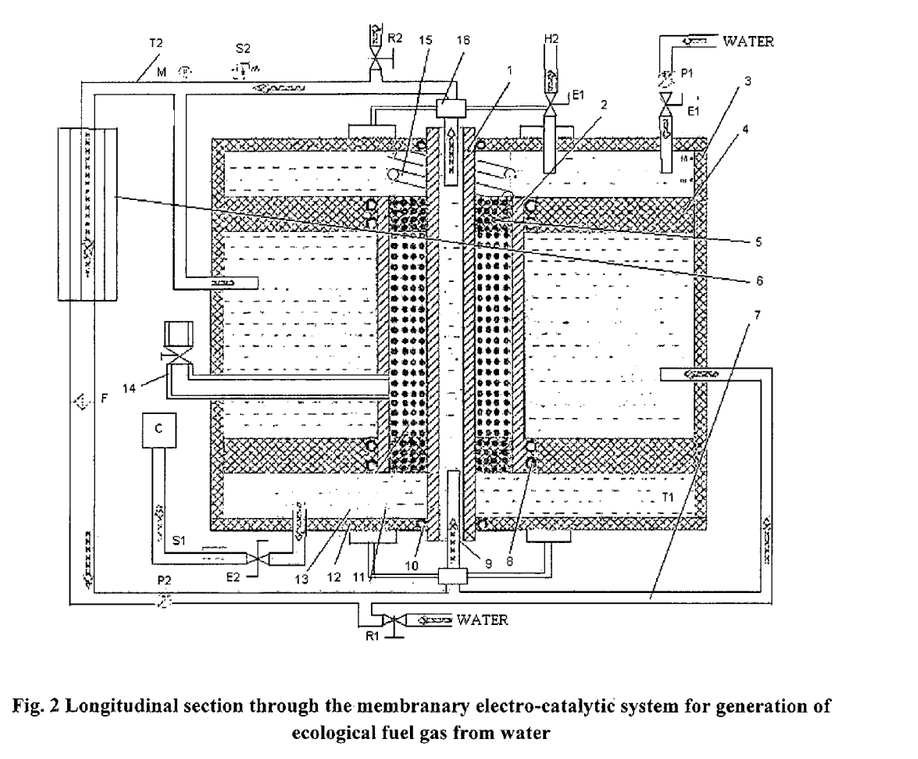
FIG. 2, a longitudinal section through the membrane electro-catalytic system for the generation of fuel gas from water.
Figure 3:
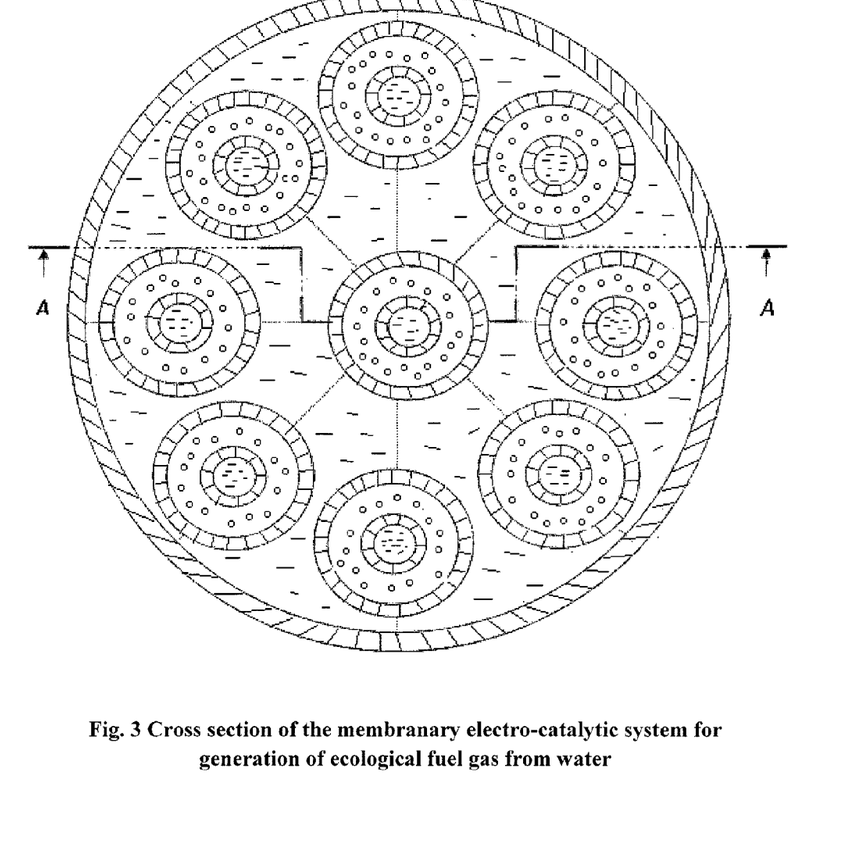
FIG. 3, a transversal section of the membrane electro-catalytic system for the generation of fuel gas from water.
Figure 4:
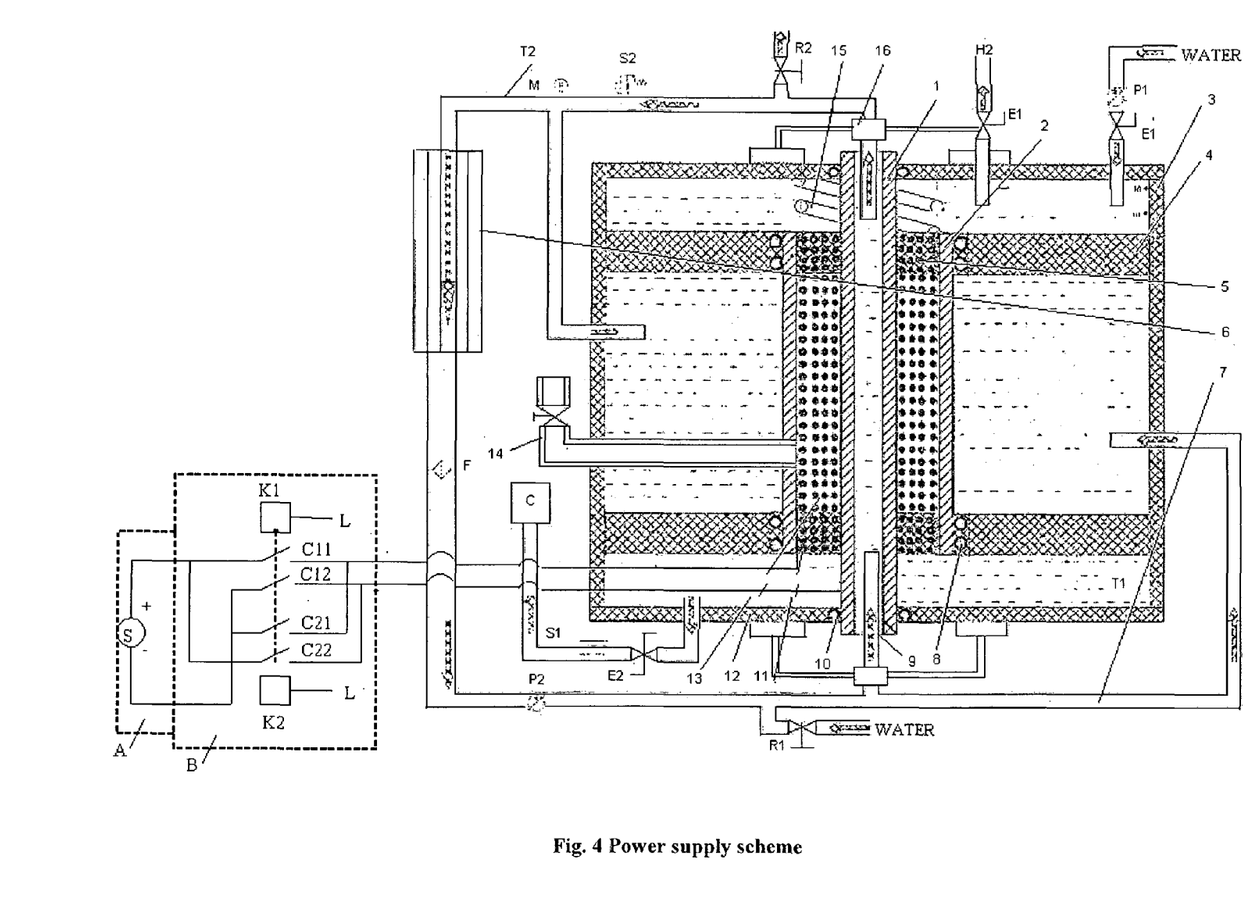
FIG. 4, a power supply.
Figure 5:
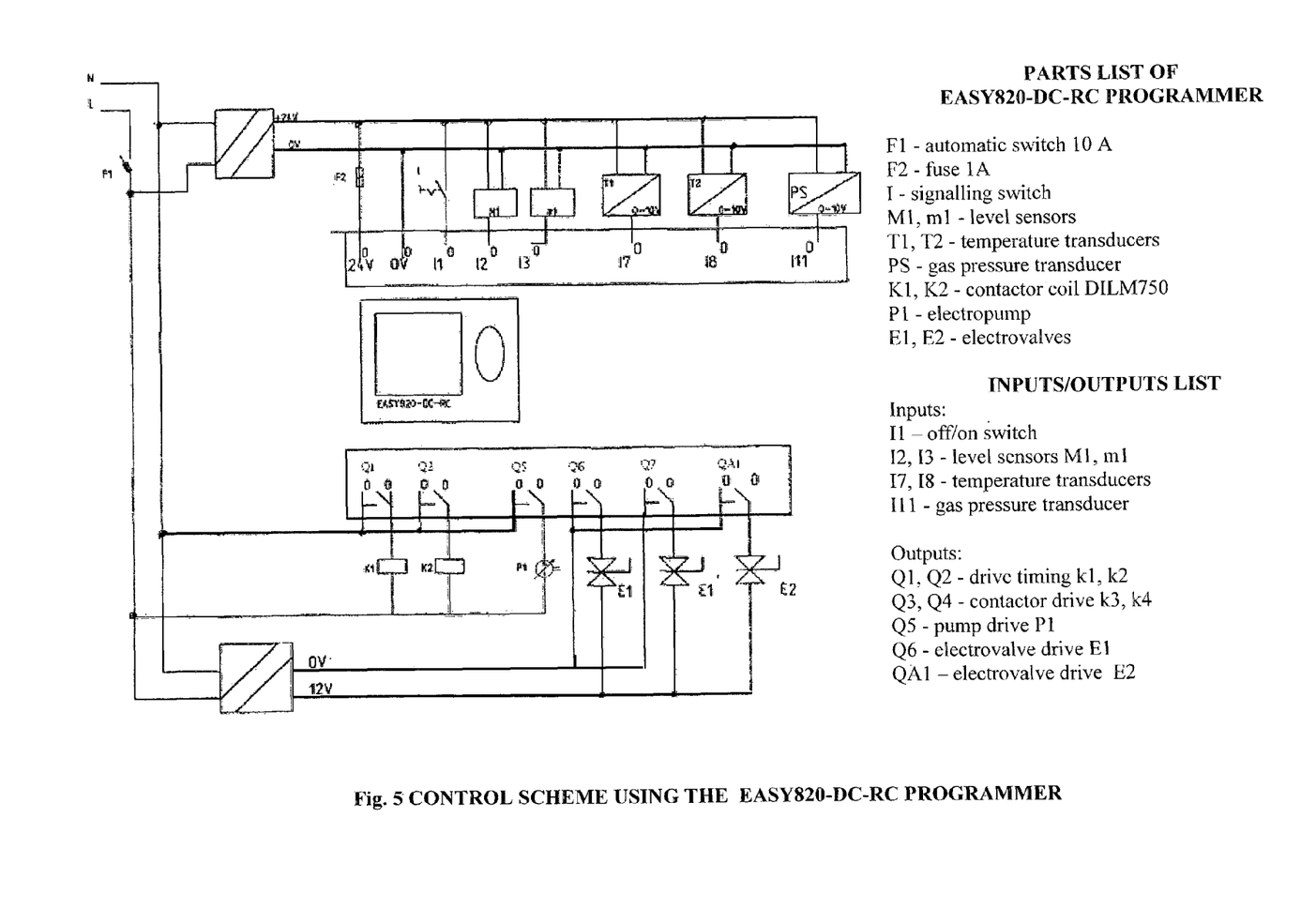
FIG. 5, a command panel with the programming device EASY820-DC-RC.

The two electrodes have a 2-3 mm thick wall.

A high density polypropylene receptacle 3 is fitted with two lids 12:
  - A superior lid is fitted with a link for the primary gas exhaust through the electro-valve $E_1$ and a water feeding pipe extends from the pump $P_1$, through the electro-valve $E_1'$;
  - An inferior lid is fitted with a water exhaust system when the water temperature surpasses 45° C., at the signal given by the temperature sensor $T_1$, through the electro-valve $E_2$, with the direction of the vent $S_1$ extending towards the consumer c. The two lids are fitted with a sealing system of "O" rings 10, for the electrodes 1. Screws are used to fix the two lids to the receptacle 3.

On the receptacle 3, the minimum m and the maximum M sensors, as well as the temperature sensor $T_1$, are fixed.

The composite membrane 5, including a spring 15, which ensures the constant pressure of the active coal 13 on the surface of the electrodes 1 and 2, at the same time, ensures a selectivity for the produced gas, thus allowing the water to circulate downward;

The cooling system is very useful so that the $CO_2$ can have a smaller volume concentration. The better the cooling, the smaller the carbon dioxide quantity and this leads to a higher concentration of carbonic acid, which allows the obtainment of an aggressive environment and an enlargement of the hydrogen flow. The cooling system is made up of a radiator 6, pipes 7, fitted with a manometer M, water feeding tap $R_1$, airing vent $R_2$, electro-pump $P_2$, filter F, supra-pressure vent $S_2$, and a water collector-distributor 16.

Figure 6:
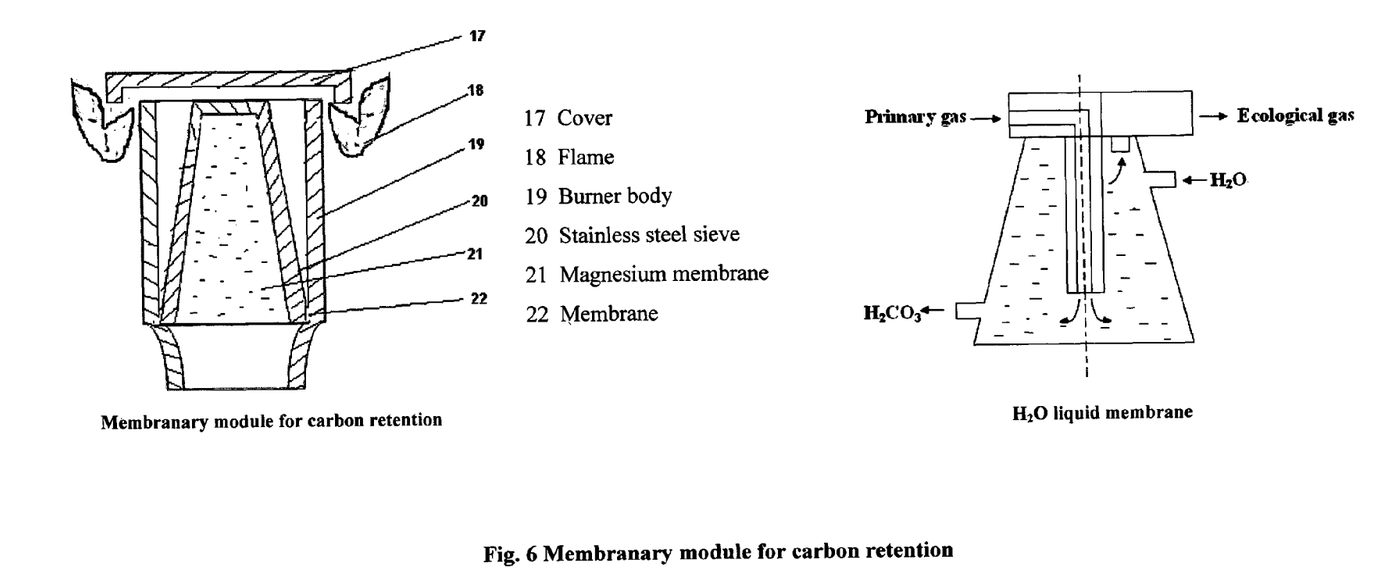
FIG. 6, a membrane module for carbon retention.

A membrane module D for the obtainment of ecological gas, as shown in FIG. 6, is made of:
  - A cast iron lid 17;
  - A cast iron body 19;
  - A magnesium composite membrane 21;
  - A stainless steel sieve 20, which fixes the membrane 21;
  - A composite membrane, at the lower end of the body 19, identical (in composition) with the composite membrane 5 from FIG. 2, 5 mm thick, ensuring the gas' permeability in the body.

The preparation and automatic command of the system, including the introduction of water into the system's circuits and the feeding at set parameters, are made through the programmer EASY 820-DC-RC, for two cycles of the fuel gas production installation: an intensive cycle, in which the module will work at full charge; and another cycle, moderated so as to maintain the desired balanced state, the programming of the timing within which the electrodes are maintained in a polarized state is made according to the sedimentation and the degradation state caused by the electro-erosion of the electrodes.

Different functioning cycles have been used to ensure the maximum reliability of the system as follows: 40 seconds direct power, 20 seconds reversed power or 40 minutes direct power and 20 minutes reversed power, taking into account the electrodes' configuration, as well as the practically obtained results.

The program that drives the system's programmer is characterized by the fact that it sets the automatic realization of the following functioning sequences:

The feeding of the installation from the power source (S) (80 V and 300 A), which is made through the contactors ($K_1$) and ($K_2$) of type DILM750, the reels of the contactors being triggered by the two output relays ($Q_1$) and ($Q_2$) of the programmer;

When the gas pressure, measured by the pressure sensor connected to the analytical input (I11) of the programmer, will surpass 0.2 bar, the electro-valve ($E_1$) opens and the gas reaches the membrane consumer-module (D), and if the pressure of the gas is smaller than 0.1 bar, the electro-valve ($E_1$) will close down.

The water from the receptacle (3) will balance between the two level sensors ($M_1$) and ($m_1$), by switching on and off the electro-pump ($P_1$) (UPS 32-60), simultaneously with the opening and closing of the electro-valve ($E_1'$), fed at 220 V through the output reel ($Q_5$) of the programmer.

The immersion temperature transducer ($T_1$) (TLT130), connected to the analytical input (17), will set the temperature limits of the water to allow the normal functioning of the membrane electro-catalytic module which produces the fuel gas so that, if $T_1$>45° C., the electro-valve ($E_2$), connected to the output ($QA_1$), will open_and warm water will be directed towards the consumer (c), because the water cooling electro-pump ($P_1$) is switched on while ($E_1$) is closed. When $T_1$<25° C., the pump ($P_1$) and the electro-valve ($E_2$) will shut down.

The temperature transducer ($T_2$) (TLT130), connected to the analytical input ($I_8$) of the programmer, will set the optimal temperature interval for the heating of the radiator so that, if $T_2$>45° C., the generator stops being fed so that the electro-pump ($P_2$) and the electro-valve ($E_1$) stop working. When the water temperature decreases to a level preset by the consumer and set by the programmer, the installation turns on again.

The supra pressure vent ($S_2$) will automatically open when the water pressure in the pipes will surpass 2 bar, and the installation can be shut down even if the pressure detected by the pressure sensor, situated in the receptacle (3), is higher than 0.5 bar, by automatically turning on/off the switch (I).

From an electrochemical point of view, the cathode (−) electrons migrate towards the anode (+), thus generating metallic ions which detach from the cathode and migrate to the anode, thus causing sedimentation of the metallic elements on the surface of the anode.

Chemical Reactions within the Process $$4H_2O + C \rightarrow CO_2 + 4H_2 + O_2 + Q$$

Part of the $CO_2$ is eliminated together with the $H_2$, $O_2$ and Q, and the other part reacts with the $H_2O$, thus increasing its conductivity by producing an electrolyte ($H_2CO_3$), proportionally with the amount of cooling.

$$CO_2 + H_2O \leftrightarrow H_2CO_3$$

$$H_2CO_3 \leftrightarrow H^+ + HCO_3^-$$

$$HCO_3^- \leftrightarrow H^+ + CO_3^{2-}$$

$$4H^+ + 4e^- \rightarrow 2H_2$$

$$C + O_2 = CO_2 + 4e^-$$

$$H_2O + H_2CO_3 \rightarrow CO_2 + 2H_2 + O_2$$

Output

+Mg $$CO_2 + H_2 + O_2 \rightarrow 2MgO + C + H_2 + O_2 + Q$$

where $CO_2 + H_2 + O_2$—primary fuel gas, but also ecological fuel gas.

In order to regenerate the magnesium catalyst, hydrogen is passed over the magnesium oxide, thus resulting in pure magnesium and water.

An alternative to the use of magnesium is a liquid membrane ($H_2O$) where $CO_2$ is retained. In this variant, water must be as cold as possible and must be re-circulated so as to increase the $CO_2$ absorption degree.

The primary gas concentration is the following:
95-98% $H_2$;
1.9-2.5% $O_2$;
0.1-2.5% $CO_2$.

The concentration of the ecological fuel gas obtained after the purification through the composite membrane based on magnesium is the following:
98-99% $H_2$;
0.99-1.8% $O_2$;
0.01-0.2% $CO_2$.

Fuel gas was analyzed by chromatography within accredited laboratories: DOLJCHIM Craiova and The Institute of Physical Chemistry of the Romanian Academy.

The electro-catalytic process can be accelerated through the use of 3d transitional metals (Fe, Ni, Cr, Cu) and Mg acting as a promoter. Metallic sediment on the cathode or the anode are included among the carbon granules.

The electrochemical phenomena which take place as a result of the metallic sedimentation (i.e., the ionization and sedimentation on the anode) are the cause of their promoting action over the electro-catalytic process produced.

At the level of the fuel gas generation, according to the invention, the process is maintained at the same potential, so that it ensures a distribution of the electrical field lines towards the full mass of electrodes, active coal with nanometric particles, and water. This electric configuration, associated with the qualities of active coal or graphite manifested all along the surface of the interface between water and carbon, ensures maximum efficiency. An important electrode polarization shift, at position 1 and position 2 (FIG. 2), ensures a larger reliability, given the corrosive effect at the cathode (−), so that the produced ions can be transported from one electrode to the other.

An important feature of the invention is that it can be modulated according to the necessities. It is appropriate for stationary applications but also for transportation-specific applications, due to its adaptability.

Basically, the procedure resides in:
the partial electro-chemical oxidation of carbon and other elements (Cr, Ni, Mg, Cu, Fe) with oxygen from water, thus releasing $H_2$.

The oxidation reaction releases heat which is then recaptured through the cooling of the electrodes.

Under the process conditions in which the water temperature (for decomposition) is lower but also the electrodes' temperature is lower, a series of chained reactions take place, favoring the production of hydrogen with increased purity, as mentioned above.

The reactivity of the oxidation processes in the presence of carbonic acid much surpasses the reactivity obtained in the presence of acetic acid or formic acid.

At a water temperature above 45° C., one may notice the reduction of the hydrogen quantity and the increase of the $CO_2$ production. Practically, the process is inefficient for our purpose, i.e., obtaining a highly ecological pure degree of fuel.

In regard to the oxidation of the cathode, the invention supposes two parallel and simultaneous reactions, chained through a rigorous energetic chain of reactions: one of oxidation and one of reduction.

The oxidation reaction supposes the ionization of the metal. The metallic structure is made up of metallic ions and an electron network, with the electrons moving within the valence band under the action of the external electric field or through a temperature increase.

In the presence of an aggressive environment, the metals have a tendency to pass as ions in the environment, thus leaving on the metal a net charge, made up of electrons corresponding to the ionized metallic atom. The negative charge of the metallic surface attracts a quantity of positive ions in the immediate vicinity, thus absorbing the cations present in the environment and the polarizable molecules from the space in-between the electrodes.

Electrostatic forces act on the ions and dipoles in the triggered by the contrary sign charges on the surface of the metal. The ions and the dipoles tend to distribute unevenly while the thermic agitation tends to distribute them evenly in the solution. The result of the two actions leads to a difference of potential between the metallic surface and the solution (environment) which contains contrary sign charges.

The metal ionization reaction can be thus described:

$$M \rightarrow M^{z+} + ze$$

The metallic ions either combine and pass through in a solid state, thus being eliminated as oxides, or are attracted by the anode which, together with the electrons released at the cathode, result in sediment in a metallic form.

In regard to the oxidation of the introduced microelements, oxidation of the microelements introduced in the reaction environment leads to an intensification of the water decomposition processes and, implicitly, to an increase of the quantity of hydrogen produced. This burning reaction of the microelements is similar to the one taking place in the human body when producing an excess of energy and simultaneously releasing a large quantity of hydrogen.

The process of hydrogen generation is much more intensified when, in the reaction environment, instead of microelements, metallic ions would be introduced, said ions having a high reaction capacity with oxygen.

Thus, in view of producing as much hydrogen as possible from water, we watched and exploited the chemical, thermal and electrical affinities of oxygen and its compounds, with hydrogen practically emerging as a secondary (collateral) element.

EXAMPLE 1

A continuous power source was used, of 80 V and 300 A, a generator module with 9 electrode pairs, with a capacity of 100 liters of water. The electrodes were connected to the source, ensuring the alternating of 40 seconds by 20 seconds of their polarity, thus obtaining:
consumed electric energy—7 kWh;
obtained caloric energy—4 $Nm^3$ fuel gas; and
caloric energy—4.7 kWh.

EXAMPLE 2

Figure 7:
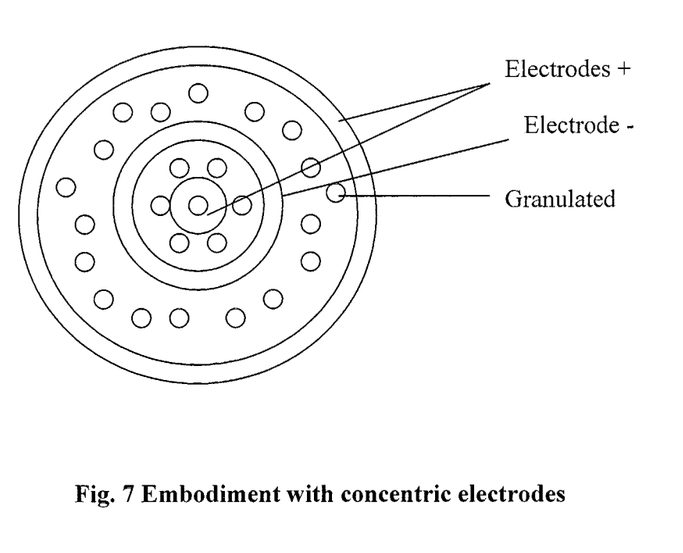
FIG. 7, an example of a concentric electrodes embodiment.
Figure 8:
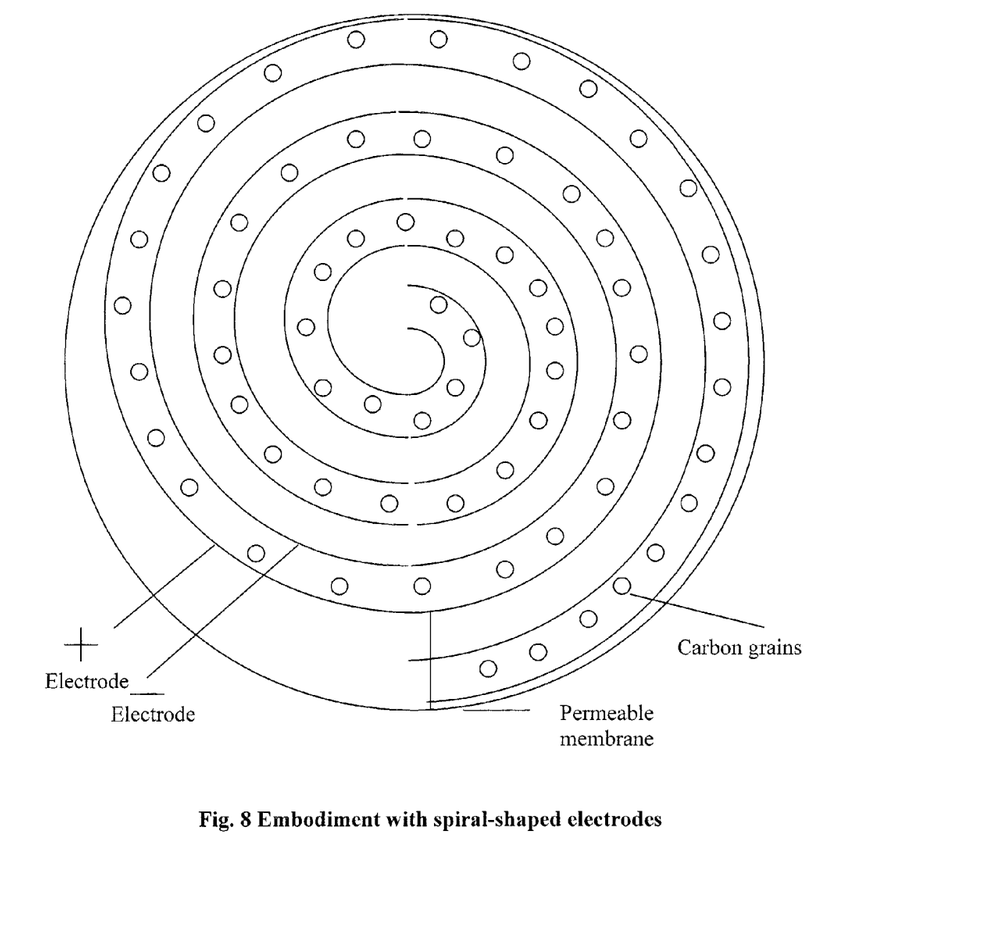
FIG. 8, an example of a spiral-shaped electrodes embodiment.

FIG. 7

Under the same conditions as the ones displayed by the first example, a third electrode is introduced (between electrodes 1 and 2), which are connected to the cathode (−), while electrodes 1 and 2 will be connected to the anode (+). The newly introduced electrode is an attrition electrode, because it can function over a longer period of time with the uppermentioned polarization, after which the electrodes' polarization can be changed so that the system's reliability would increase. The attrition electrode can be a composite of carbon, magnesium, copper, iron, nickel, and chrome, either under various combinations of these elements or in a pure, unaltered state of the abovementioned components. In this case, the flux of the fuel gas increases by approximately 20%.

It is to be understood that, even though numerous characteristics and advantages of the present invention have been set forth in the foregoing description, together with details of the structure and function of the invention, the disclosure is illustrative only, and changes may be made in detail, especially in matters of shape, size, and arrangement of parts, within the principles of the invention to the full extent indicated by the broad general meaning of the terms in which the appended claims are expressed.

The invention claimed is:

1. An electro-catalytic membrane system for preparation of fuel gas from water, comprising:
    a) a pulsed and direct/reversed current power source with a frequency ranging from 50 Hz to 20 kHz;
    b) an electronic control system including:
        i) a power supply system made of a switched reluctance generator and contactors; and
        ii) a programmable control unit;
    c) an electro-catalytic membrane module including:
        i) inner and peripheral metallic electrodes, disposed in a concentric arrangement, each electrode being connected to the source by a copper conductor and having a wall thickness ranging from 2 to 3 mm, wherein the inner electrodes are insulated on their inner surface and fitted with two lids and wherein the peripheral electrodes are insulated on their outer surface and either plated with, or having a composite layer of an electrochemical deposit of various metals, such as Ni, Cr, Fe, Mg, Cu, on their inner surface, said peripheral electrodes being also fixed by two high density polypropylene plaques which are fitted with four rings,
        ii) a catalyst acting as an electrolyte, including carbon nano-particles and carbon atoms obtainable from carbonized vegetable materials activated with water vapors, or granular graphite, said catalyst being combined with Ni, Cr, Fe, Mg, Cu acting as promoters and being present either as microelements or metallic ions, said promoters having an active surface which reaches 2000 $m^2/g$,
        iii) a high density polypropylene receptacle provided with an upper and a lower lid, minimum and maximum level sensors, and a temperature sensor,
        wherein the upper lid is provided with a conduit for discharge of primary gas through a first electro-valve and with a conduit for water supply from a pump through a second electro-valve, and
        wherein the lower lid is provided with a conduit for discharge of water through a third electro-valve and further through backflow preventer to a consumer when a temperature of the water reaches 45 degrees Centigrade upon receiving a signal sent by the temperature sensor,
        said lids being fitted with an O-ring sealing system for the electrodes,
        iv) two composite membranes which define and immobilize the catalyst and the promoters in a space created between two concentric electrodes, said membranes being permeable for gas, water and oxides produced in the space, wherein a lower of the two composite membranes is fixed, and
        an upper of the two composite membranes is mobile, being operated by a spring which imparts pressure to the catalyst against the electrodes,
        v) a system for continuously cooling with water the electrodes fitted with two insulated surfaces, one on the inner surface of the electrode and another on the outer surface of the electrode in order to avoid creation of ions in the system for continuously cooling of the electrodes, and for control of an amount of resulted $CO_2$, said system for continuously cooling being made up of a radiator, conduits, said conduits being provided with a manometer, a water feeding tap, an air vent, an electro-pump, a filter, a pressure relief valve, and a water collector-distributor; and
    d) a membrane module wherein the fuel gas is obtained, said membrane module being made up of either
        i) a composite membrane having a thickness ranging from 3 to 5 mm, positioned at a lower end of the body of a receptacle, to allow the gas to pass into the body, and a sieve in a shape of a truncated cone and made of stainless steel, wherein the sieve is loaded with Mg to ensure reduction of the $CO_2$ into pure carbon and magnesium oxide, or
        ii) a liquid membrane.

2. An electro-catalytic membrane system according to claim 1, wherein several electro-catalytic membrane modules are connected in series or in parallel to the same power source and to the same electronic control system.

3. An electro-catalytic membrane system according to claim 1, wherein the composite membrane has a thickness ranging from 7 to 10 mm and is obtainable by pouring a solution over the catalyst and the promoters, whereby the solution consists of 10-12% polysulphone, 0.1-0.2% polyethylene glycol and up to 100% N-methyl-2-pyrrolidinone.

4. An electro-catalytic membrane system according to claim 1, wherein the electrodes are pipe-shaped and made of copper or stainless steel.

5. An electro-catalytic membrane system according to claim 1 wherein the electrodes are spiral-shaped and made of copper or stainless steel.

6. An electro-catalytic membrane system according to claim 1, wherein a third electrode made of copper or stainless steel is inserted in the space created between the electrodes and it is connected to a cathode.

7. A process for obtaining fuel gas from water using an electro-catalytic membrane system as defined in claim 1, wherein an electrical current with a frequency ranging from 50 Hz to 20 kHz and a variable voltage ranging from 40 to 80 V is run through water, either by applying a direct voltage for 40 seconds and a reverse voltage for 20 seconds, or by applying a direct voltage for 40 minutes and a reverse voltage for 20 minutes, to obtain a fuel gas containing 98-99% Hz, 0.99-1.80% 02, and 0.01-0.2% $CO_2$ under a pressure maintained between 0.1 and 0.2 bar, while water pressure ranges between 0.5 and 2 bar and water temperature ranges between 25° C. and 45° C.

8. A process according to claim 7, wherein the frequency of the electrical current is 20 kHz.

* * * * *